(12) United States Patent
Klein et al.

(10) Patent No.: US 11,025,090 B2
(45) Date of Patent: Jun. 1, 2021

(54) DETERMINING LOCATION AND DISRUPTION SEQUENCE OF POWER OUTAGES

(71) Applicant: INTERNATIONAL BUSINESS MACHINES CORPORATION, Armonk, NY (US)

(72) Inventors: Levente Klein, Tuckahoe, NY (US); Alejandro G. Schrott, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/058,911

(22) Filed: Mar. 2, 2016

(65) Prior Publication Data

US 2017/0256153 A1    Sep. 7, 2017

(51) Int. Cl.
*G08B 21/18* (2006.01)
*H02J 13/00* (2006.01)
*G08B 27/00* (2006.01)

(52) U.S. Cl.
CPC ........ *H02J 13/0075* (2013.01); *G08B 21/185* (2013.01); *G08B 27/003* (2013.01); *G08B 27/006* (2013.01); *Y02E 60/00* (2013.01); *Y04S 40/126* (2013.01)

(58) Field of Classification Search
CPC ... G08B 21/185; G08B 27/003; G08B 27/006
USPC .......................................... 340/654; 700/286
See application file for complete search history.

(56) References Cited

U.S. PATENT DOCUMENTS

| | | |
|---|---|---|
| 5,136,281 A | 8/1992 | Bonaquist |
| 5,909,480 A | 6/1999 | Reynaud et al. |
| 6,581,163 B1 | 6/2003 | Sisler et al. |
| 7,274,305 B1 * | 9/2007 | Luttrell ..................... B61L 1/20 |
| | | 324/141 |
| 7,746,877 B2 | 6/2010 | Trethewey |
| 7,965,195 B2 | 6/2011 | Deaver, Sr. et al. |
| 8,121,743 B2 | 2/2012 | Boss et al. |
| 9,020,419 B2 | 4/2015 | Gaines et al. |
| 9,041,544 B2 | 5/2015 | Bagasra |
| 9,490,635 B2 | 11/2016 | Lee et al. |
| 9,997,048 B2 | 6/2018 | Jeon |
| 2004/0236620 A1 * | 11/2004 | Chauhan ................ G06Q 10/06 |
| | | 705/7.14 |
| 2005/0047782 A1 * | 3/2005 | Davis .................. H04L 12/2861 |
| | | 398/58 |

(Continued)

*Primary Examiner* — Jack K Wang
(74) *Attorney, Agent, or Firm* — Tutunjian & Bitetto, P.C.; Randall Bluestone

(57) ABSTRACT

Systems and a method are provided. A system includes a set of power loss detecting and reporting apparatuses. Each of the power loss detecting and reporting apparatuses includes a power loss detection circuit for detecting a local power loss. Each of the power loss detecting and reporting apparatuses further includes a cellular transmitter for transmitting (i) a preloaded code indicative of a power loss location and (ii) a time stamped alarm, to a remote designee entity using a cellular network, responsive to a detection of the power loss. The set of apparatuses collectively provide an outage pattern and sequence for a plurality of supplied locations based on the preloaded code and the time stamped alarm.

20 Claims, 12 Drawing Sheets

(56) References Cited

U.S. PATENT DOCUMENTS

| | | | |
|---|---|---|---|
| 2007/0179726 A1* | 8/2007 | Bickel | G01R 22/063 702/69 |
| 2008/0247760 A1 | 10/2008 | Edmon et al. | |
| 2009/0184835 A1* | 7/2009 | Deaver, Sr. | H02J 13/0062 340/660 |
| 2009/0187285 A1 | 7/2009 | Yaney et al. | |
| 2011/0218686 A1* | 9/2011 | McHann, Jr. | H02J 13/0086 700/286 |
| 2013/0257623 A1* | 10/2013 | Bagasra | G08B 27/005 340/657 |
| 2014/0104981 A1* | 4/2014 | Duboue | G01V 1/201 367/15 |

* cited by examiner

DETERMINING LOCATION AND DISRUPTION SEQUENCE OF POWER OUTAGES

BACKGROUND

Technical Field

The present invention relates generally to power systems and, in particular, to determining the location and disruption sequence of power outages.

Description of the Related Art

During or after outages caused by violent weather events, the repair response by electric utilities is impaired by a lack of comprehensive knowledge of the blackout event. For example, the electric utilities have neither a complete nor instantaneous report of the number of affected houses, their locations and the sequence of the power disruption. It is common for request people to call in and report blackouts and dispatch crews based on the number of reports coming from a certain area or areas. In particular, in areas such as Eastern Long Island, where many housing units are second homes, the reporting of an outage has proven to be more difficult. However, a complete report on the location is very useful for planning the repairing work associated with restoring power.

Thus, power utilities typically rely on household reports, and currently better statistics are attained due to the prevalence of cellular phone technology. There are household alarms such as the "Reliance Automatic Phone out Alarm" that automatically dial pre-loaded numbers to alert the absent owner or person in charge of a temperature drop, a loss of power, and so forth. However, these devices rely on a line telephone connection which can become disconnected due to a storm. Also, these devices are directed to the homeowner and, thus, do not necessarily provide a strong link, if any, to the utility company.

SUMMARY

According to an aspect of the present principles, a system is provided. The system includes a set of power loss detecting and reporting apparatuses. Each of the power loss detecting and reporting apparatuses includes a power loss detection circuit for detecting a local power loss. Each of the power loss detecting and reporting apparatuses further includes a cellular transmitter for transmitting (i) a preloaded code indicative of a power loss location and (ii) a time stamped alarm, to a remote designee entity using a cellular network, responsive to a detection of the power loss. The set of apparatuses collectively provide an outage pattern and sequence for a plurality of supplied locations based on the preloaded code and the time stamped alarm.

According to another aspect of the present principles, a system is provided. The system includes a centralized power loss server. The centralized power loss server includes a cellular receiver for receiving a preloaded code and a time stamped alarm from each of one or more remote locations at which a local power loss has been detected. The centralized power loss server further includes a data processing system for monitoring a spread of the local power loss based on an order of receiving the preloaded code and the time stamped alarm from the one or more remote locations. The centralized power loss server also includes a power manager for initiating a curative action for the local power loss based on the spread.

According to another aspect of the present principles, a method is provided. The method includes configuring a set of power loss detecting and reporting apparatuses, each of the apparatuses having a power loss detection circuit and a cellular transmitter. The method further includes deploying the set of power loss detecting and reporting apparatuses at a plurality of supplied locations to collectively provide an outage pattern and sequence for the plurality of supplied locations based on the preloaded code and the time stamped alarm. The configuring step includes configuring the power loss detection circuit of each of the apparatuses to detect a local power loss. The configuring step further includes configuring the cellular transmitter of each of the apparatuses to transmit (i) a preloaded code indicative of a power loss location and (ii) a time stamped alarm, to a remote designee entity using a cellular network, responsive to a detection of the power loss.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to determining the location and disruption sequence of power outages.

In an embodiment, a method and system are described that provide accurate instantaneous location and time stamped information on power outages to utility companies, and also provide analytics for the utility companies to better determine the locus of initiation of local outages and strategies for optimizing the repairs. In an embodiment, it is presumed that despite the existence of a power outage, a cellular phone system is available (e.g., due to the availability of power back up systems for cellular antenna arrays).

In an embodiment, the present principles involve an apparatus that connects to the house power and, upon a power loss, activates a call and transmits a message to a predesignated number/location through a battery operated cellular communication device to report the power loss to a designated entity/location. The apparatus can be made inexpensively and, for optimum deployment, can be offered by the power company through some incentive to the customer.

In an embodiment, the message to be transmitted is a pre-logged code that includes the address and location of the house, and a time stamp, which informs the designee/recipient of the location and time of the power loss, and which can also make information available such as, for example, safety instructions (e.g., the location of power box), contact phone numbers, and so forth. The message is received by, e.g., a computer at the command and control location of the designee/recipient location. The computer analyzes all of the reports based on the location and time of occurrence to determine outage origin, priority locations for effecting the repairs and optimizing the repair path, and so forth.

Figure 1:
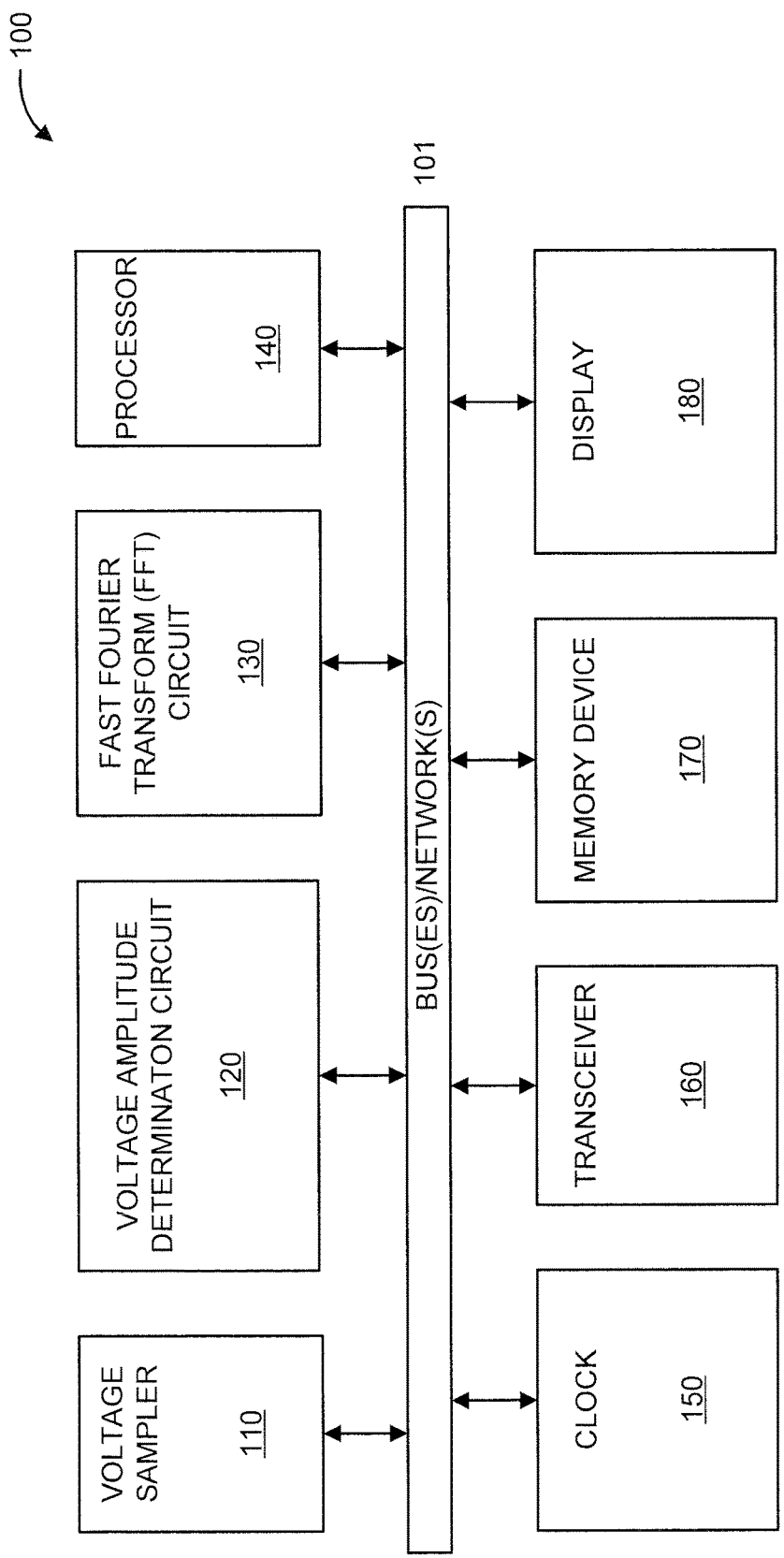
FIG. 1 shows an exemplary apparatus 100 for determining the location and disruption sequence of power outages, in accordance with an embodiment of the present principles.
Figure 2:
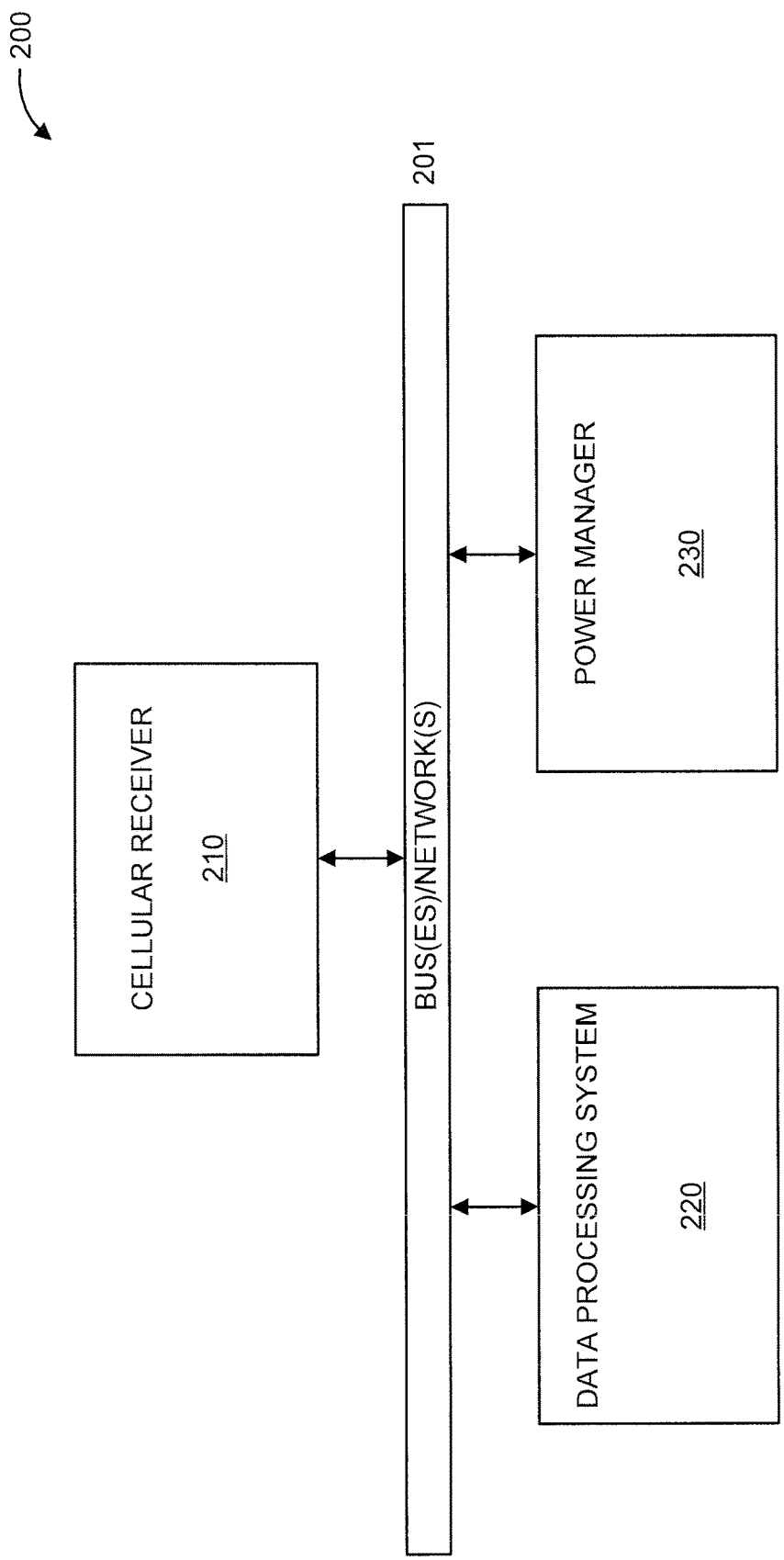
FIG. 2 shows an exemplary apparatus 200 for determining the location and disruption sequence of power outages, in accordance with an embodiment of the present principles.

FIGS. 1 and 2 shows respective apparatuses that can be used in accordance with the teachings of the present principles. In an embodiment, FIG. 1 corresponds to apparatuses that are located at places to be monitored (e.g., residences, businesses, etc.), and FIG. 2 corresponds to the apparatus/entity receiving (and potentially acting upon) information provided by the devices at the places to be monitored.

FIG. 1 shows an exemplary apparatus 100 for determining the location and disruption sequence of power outages, in accordance with an embodiment of the present principles. The apparatus 100 is interchangeably referred herein as a "power loss detecting and reporting apparatus".

The apparatus 100 includes a voltage sampler 110, a voltage amplitude determination circuit 120, a Fast Fourier Transform (FFT) circuit 130, a processor 140, a clock 150, a transceiver 160, a memory device 170, and a display 180.

The voltage sampler 110 samples the power supplied to a given location (e.g., a building such as a home, a business, and so forth).

The voltage amplitude determination circuit 120 determines the amplitude of the voltage sampled by the voltage sampler 110. In an embodiment, the voltage amplitude determination circuit 120 includes one or more comparators.

The FFT circuit 130 transforms the sampled power signal to the frequency domain.

The processor 140 detects whether a local power outage has occurred and, in response, generates a message that includes a pre-loaded code and a time-stamped alarm for transmission to a remote designee entity (e.g., apparatus 200 in FIG. 2, which can be under the control of and/or otherwise correspond to a power company) via the transceiver 160. The processor 140 detects the occurrence of a local power outage based on the output of the FFT circuit and/or the voltage amplitude determination circuit 120. Regarding the former, in an embodiment, the processor 140 analyzes the signal in the frequency domain (output from the FFT circuit 130) to establish signal purity (i.e., detect any transients).

The transceiver 150 transmit the preloaded code and the time-stamped alarm to the remote designee entity. In an embodiment, in cases where the (initial) message did not go through or is returned, the transceiver 150 will attempt to resend the message with the original time stamp and a current (updated) time stamp attached.

The clock 160 provides a source for timestamps that are generated responsive to the detection of a local power outage.

The memory device 170 stores the preloaded code. The preloaded code can include address information, as well as other information such as customer name, and so forth.

The display 180 shows messages sent from the remote designee entity.

In an embodiment, the apparatus 100 is battery powered in order to remain operational when a local power loss occurs.

In the embodiment shown in FIG. 1, the elements thereof are interconnected by a bus(es)/network(s) 101. However, in other embodiments, other types of connections can also be used. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements in FIG. 1 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 100 are readily determined by one of ordinary skill in the art, given the teachings of the present principles provided herein, while maintaining the spirit of the present principles.

FIG. 2 shows an exemplary apparatus 200 for determining the location and disruption sequence of power outages, in accordance with an embodiment of the present principles. In an embodiment, the apparatus 200 is a centralized power loss server and is interchangeably referred to as such herein. In an embodiment, the apparatus 200 of FIG. 2 serves as the remote designee entity with which one or more of apparatus 100 of FIG. 1 interact with.

The apparatus 200 includes a cellular receiver 210, a data processing system 220, and a power manager 230.

The cellular receiver 210 receives a message with a preloaded code and a time stamped alarm from one or more remote locations at which a local power loss has been detected. For example, the message with the preloaded code and time stamped alarm are received by the cellular receiver 210 from one or more apparatuses such as apparatus 100.

The data processing system 220 monitors a spread of the local power loss based on an order of receiving the messages with the preloaded code and the time stamped alarm from the one or more remote locations.

In an embodiment, the received messages can be clustered based on zip code or based on sub power stations that serve a certain area or some other criteria. A priority can be assembled based on the time stamp and clustered data that would indicate the geographic locations of the places where power outages occur. Moreover, by tracking the time stamps, the propagation of the outage across a larger area can be assembled from the location data (per the preloaded code) and the timestamp.

The power manager 230 initiates a curative action for the local power loss based on the spread.

In the embodiment shown in FIG. 2, the elements thereof are interconnected by a bus(es)/network(s) 201. However, in other embodiments, other types of connections can also be used. Further, while one or more elements may be shown as separate elements, in other embodiments, these elements can be combined as one element. The converse is also applicable, where while one or more elements may be part of another element, in other embodiments, the one or more elements may be implemented as standalone elements.

Moreover, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present principles provided herein, while maintaining the spirit of the present principles.

Figure 3:
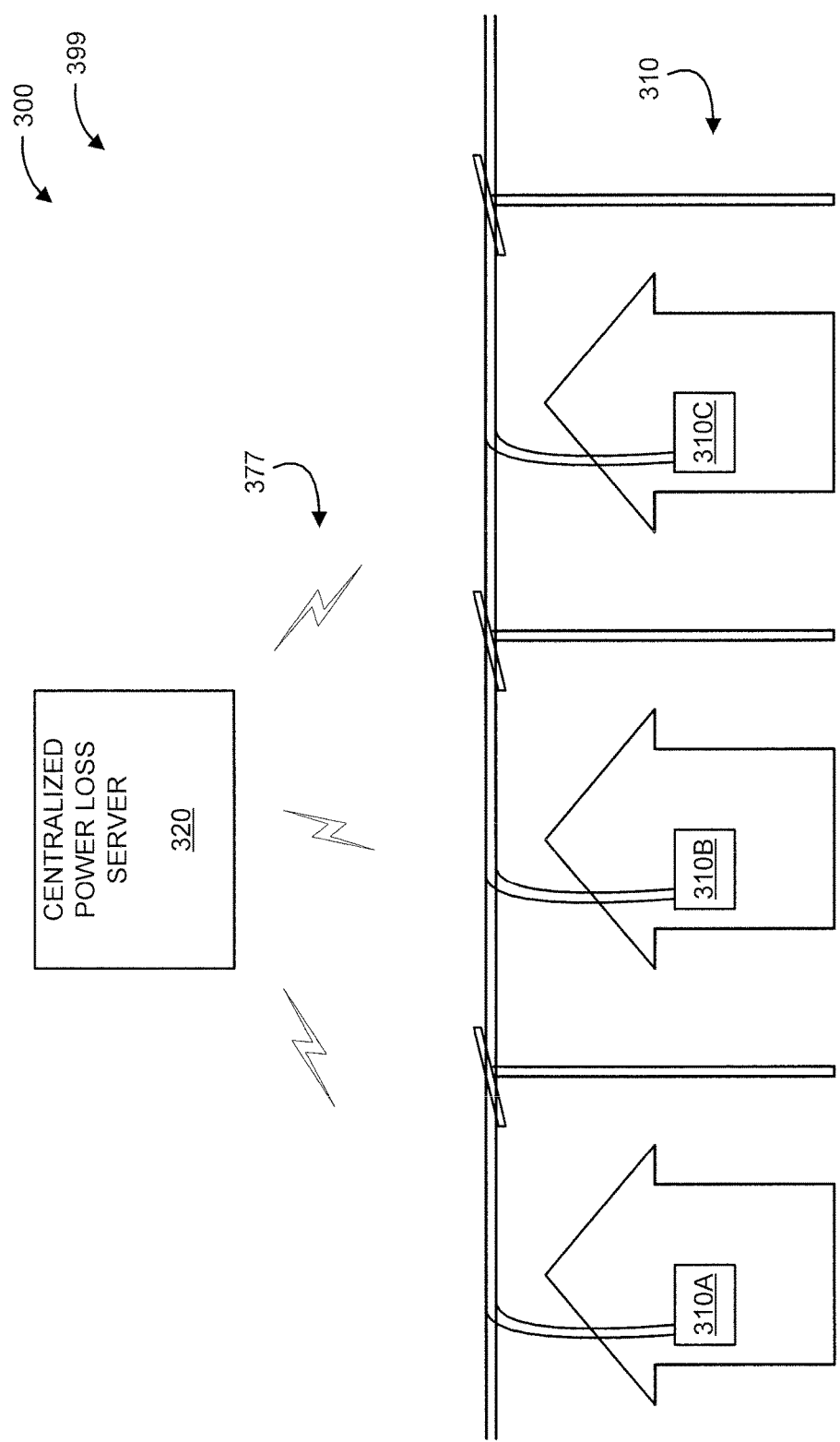
FIG. 3 shows an exemplary system 300 for determining the location and disruption sequence of power outages, in accordance with an embodiment of the present principles.

FIG. 3 shows an exemplary system 300 for determining the location and disruption sequence of power outages, in accordance with an embodiment of the present principles. In FIG. 3, the system 300 is deployed in particular scenario 399 as described hereinafter.

The system 300 includes a set of power loss detecting and reporting apparatuses collectively denoted by the reference numeral 310 and individually denoted by the reference numerals 310A, 310B, and 310C. The system 300 further includes a centralized power loss server 320.

In an embodiment, each of the apparatuses 310 are implemented by apparatus 100 of FIG. 1, and the centralized server 320 is implemented by apparatus 200 of FIG. 2.

In an embodiment, each of the apparatuses 310 is located within a building such as a residence. Each of the apparatuses 310 is configured to communicate with the centralized power loss server 320 using cellular communications 377.

Figure 4:
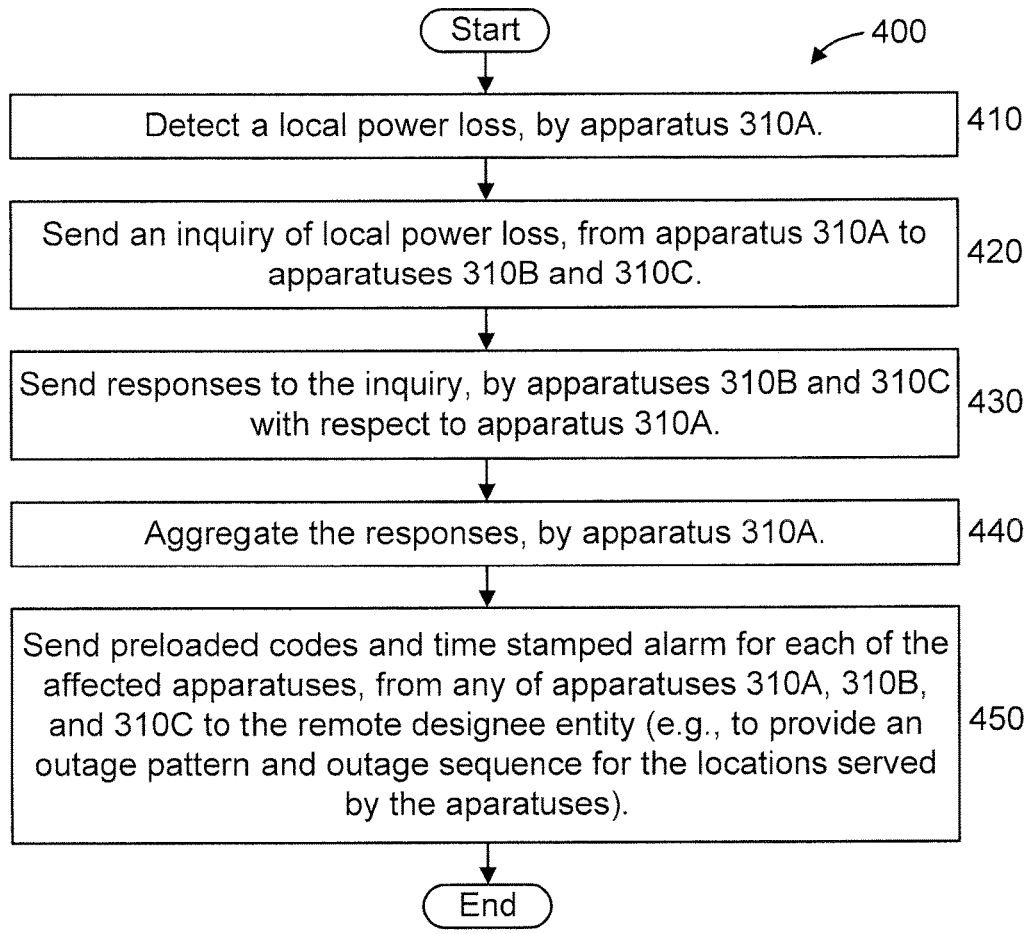
FIG. 4 shows an exemplary method 400 for determining the location and disruption sequence of power outages, in accordance with an embodiment of the present principles.

FIG. 4 shows an exemplary method 400 for determining the location and disruption sequence of power outages, in accordance with an embodiment of the present principles. The method 400 is performed regarding scenario 399 in FIG. 3.

At step 410, detect a local power loss, by apparatus 310A.

At step 420, send an inquiry of local power loss, from apparatus 310A to apparatuses 310B and 310C.

At step 430, send responses to the inquiry, by apparatuses 310B and 310C with respect to apparatus 310A.

At step 440, aggregate the responses, by apparatus 310A.

At step 450, send preloaded codes and time stamped alarm for each of the affected apparatuses, from any of apparatuses 310A, 310B, and 310C to the remote designee entity. Each preloaded code is indicative of at least a power loss location, either explicitly (by address) or implicitly (by map location, tax map information, etc.). The time stamped alarm provides a time of detection of a local power outage. In this way, the apparatuses 310 can provide an outage pattern and outage sequence for the locations served by the apparatuses 310.

Figure 5:
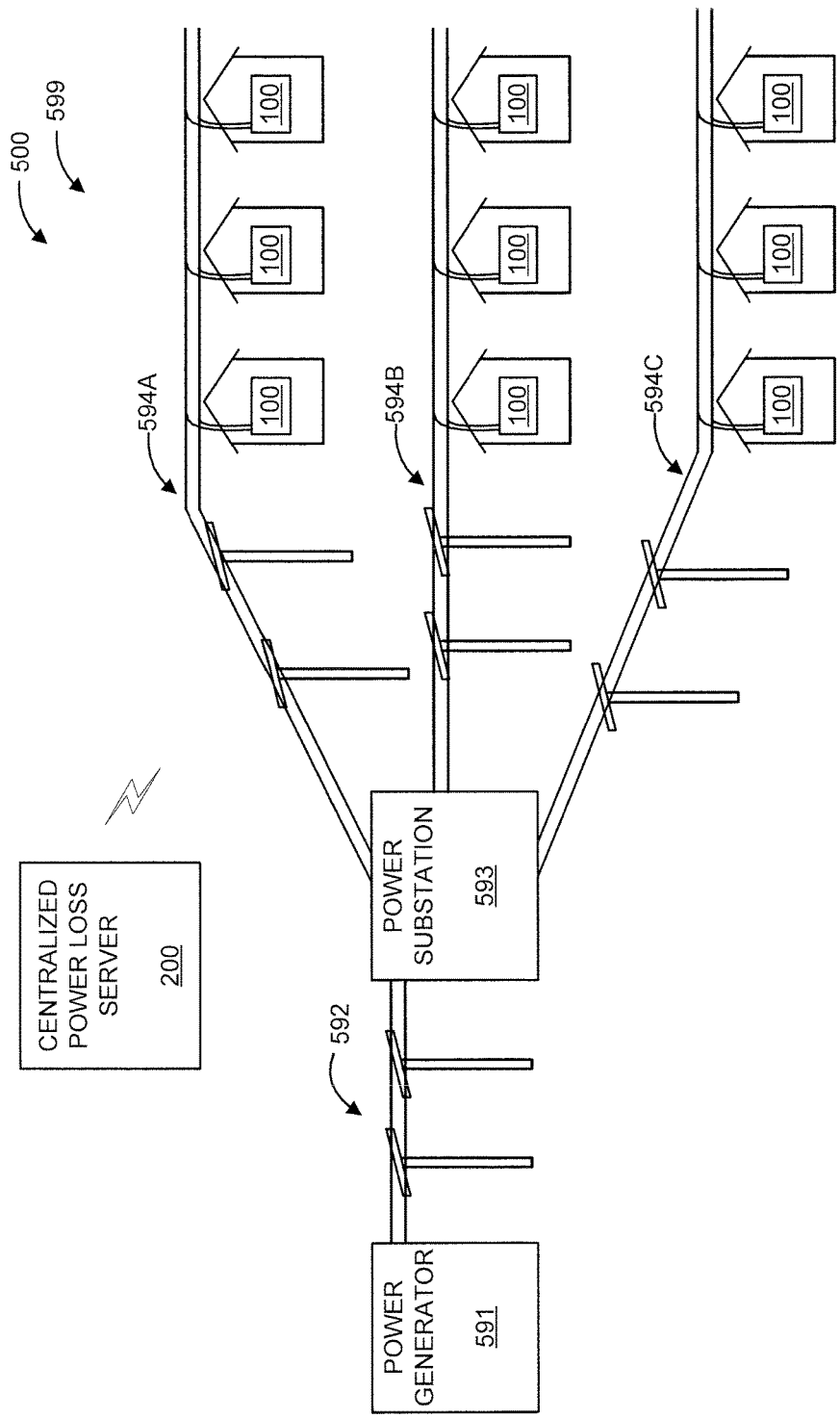
FIG. 5 shows an exemplary system 500 for determining the location and disruption sequence of power outages, in accordance with an embodiment of the present principles.

FIG. 5 shows an exemplary system 500 for determining the location and disruption sequence of power outages, in accordance with an embodiment of the present principles. In FIG. 5, the system 500 is deployed in particular scenario 599 as described hereinafter.

The scenario 599 involves a power generator 591, a transmission line 592, a power substation 593, and feeder/taps/transformers line A (hereinafter "feeder A") 594A, feeder/taps/transformers line B 594B (hereinafter "feeder B"), feeder/taps/transformers line C 594C (hereinafter "feeder C").

Along each of the feeders are buildings (e.g., residences, businesses, etc., hereinafter referred to as "homes" in short) served by the respective feeders. Each of the buildings includes a power loss detecting and reporting apparatus such as apparatus 100 in FIG. 1. Each of the apparatuses 100 interact with a centralized power loss server such as centralized power loss server 200 in FIG. 2.

Figure 6:
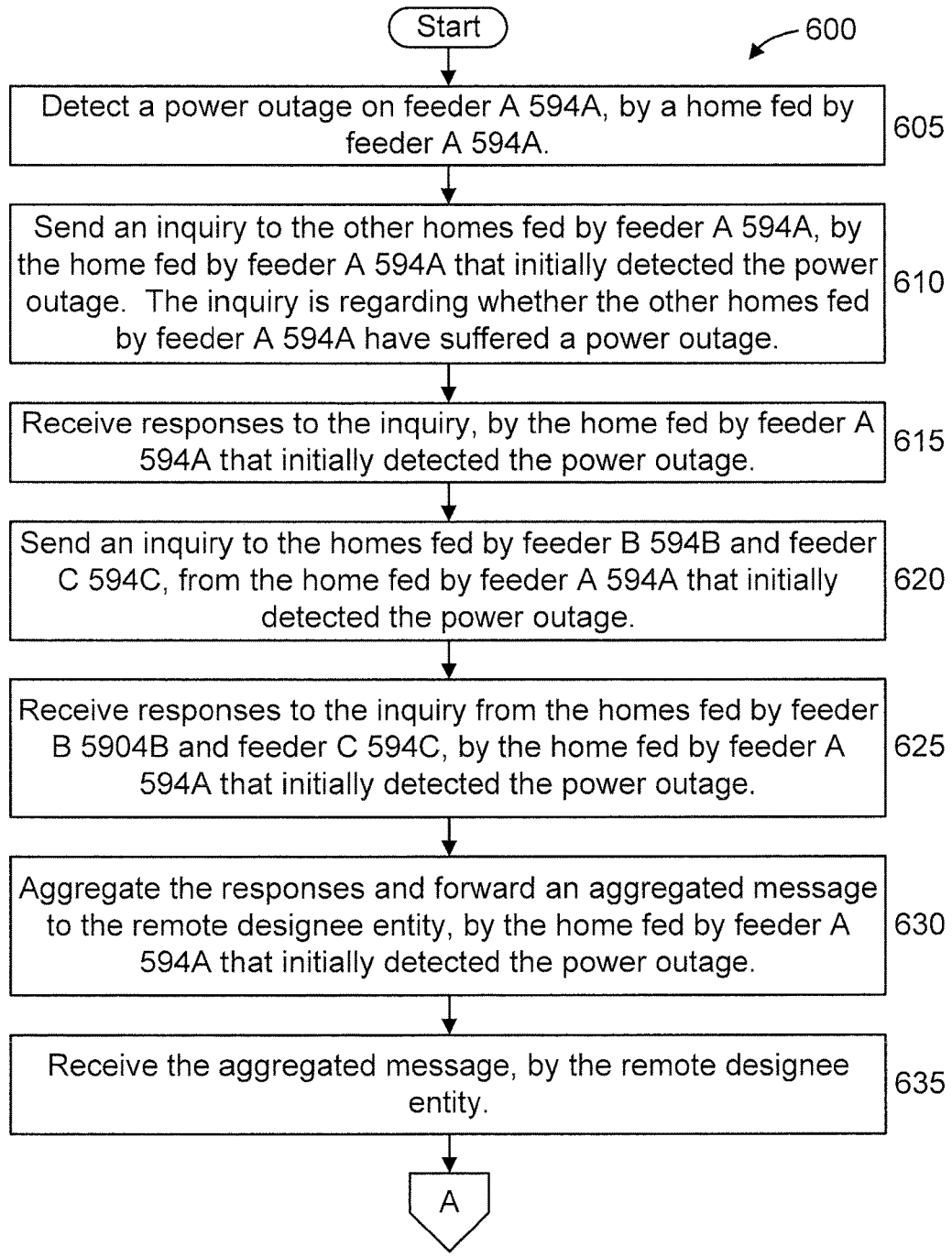
FIGS. 6-7 show an exemplary method 600 for determining the location and disruption sequence of power outages, in accordance with an embodiment of the present principles.
Figure 7:
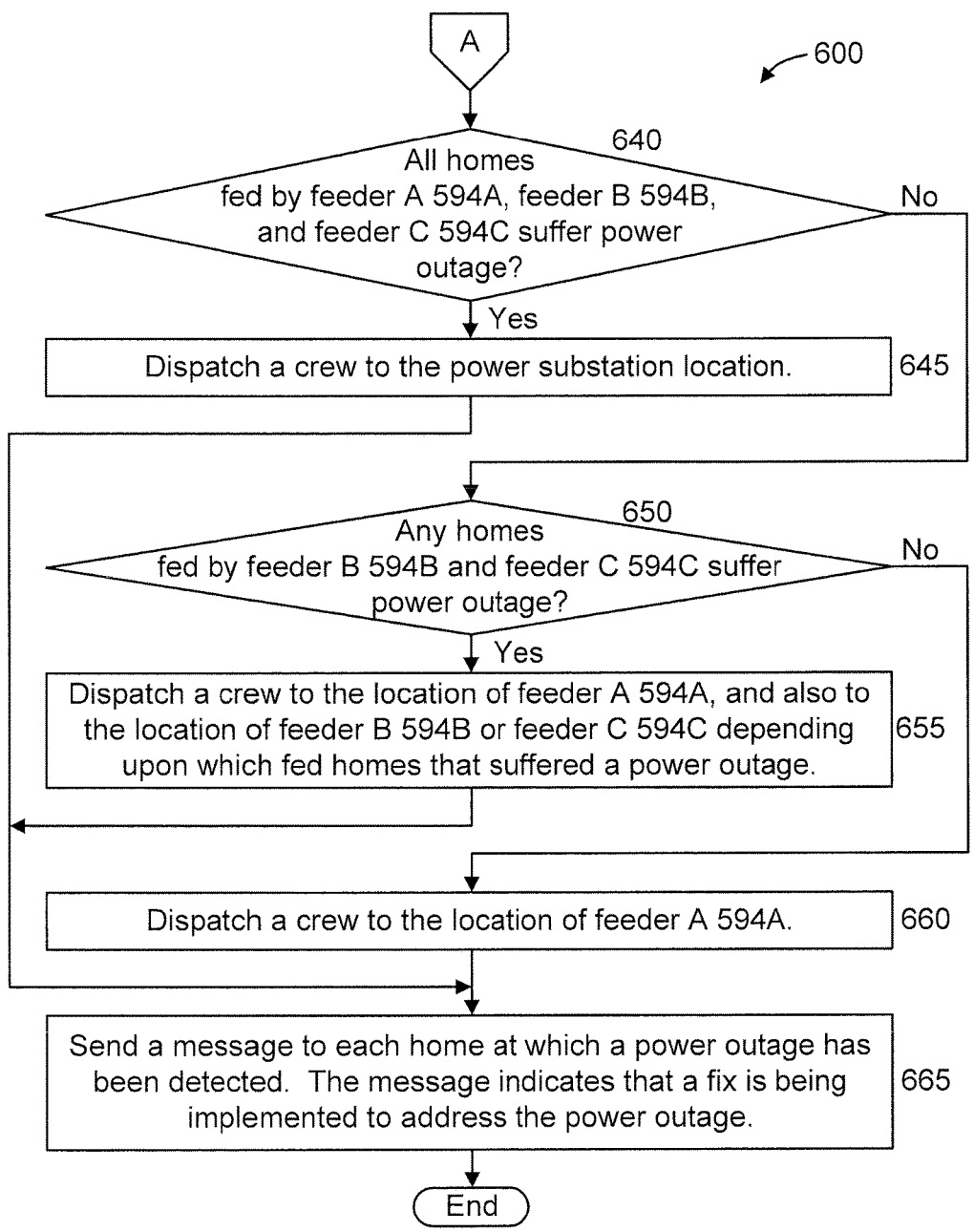

FIGS. 6-7 show an exemplary method 600 for determining the location and disruption sequence of power outages, in accordance with an embodiment of the present principles. The method 600 is performed regarding scenario 599 in FIG. 5.

At step 605, detect a power outage on feeder A 594A, by a home fed by feeder A 594A.

At step 610, send an inquiry to the other homes fed by feeder A 594A, by the home fed by feeder A 594A that initially detected the power outage. The inquiry is regarding whether the other homes fed by feeder A 594A have suffered a power outage.

At step 615, receive responses to the inquiry, by the home fed by feeder A 594A that initially detected the power outage.

At step 620, send an inquiry to the homes fed by feeder B 594B and feeder C 594C, from the home fed by feeder A 594A that initially detected the power outage.

At step 625, receive responses to the inquiry from the homes fed by feeder B 5904B and feeder C 594C, by the home fed by feeder A 594A that initially detected the power outage.

At step 630, aggregate the responses and forward an aggregated message to the remote designee entity, by the home fed by feeder A 594A that initially detected the power outage. The aggregated message can include the preloaded code (indicative of at least location) and time stamped alarm for each of the homes at which a power outage was detected.

At step 635, receive the aggregated message, by the remote designee entity.

At step 640, determine whether all of the homes fed by feeder A 594A, feeder B 594B, and feeder C 594C have suffered a power outage, by the remote designee entity based on the aggregated message. If so, then the method proceeds to step 645. Otherwise, the method proceeds to step 650.

At step 645, dispatch a crew to the power substation location.

At step 650, determine whether any homes fed by feeder B 594B and feeder C 594C have suffered a power outage, by the remote designee entity based on the aggregated message. If so, then the method proceeds to step 655. Otherwise, the method proceeds to step 660.

At step 655, dispatch a crew to the location of feeder A 594A, and also to the location of feeder B 594B or feeder C 594C depending upon which fed homes that suffered a power outage.

At step 660, dispatch a crew to the location of feeder A 594A. In an embodiment, the crew is dispatched to the location of the home fed by feeder A 594A that initially detected the power outage.

At step 670, send a message to each home at which a power outage has been detected. The message indicates that a fix is being implemented to address the power outage.

Figure 8:
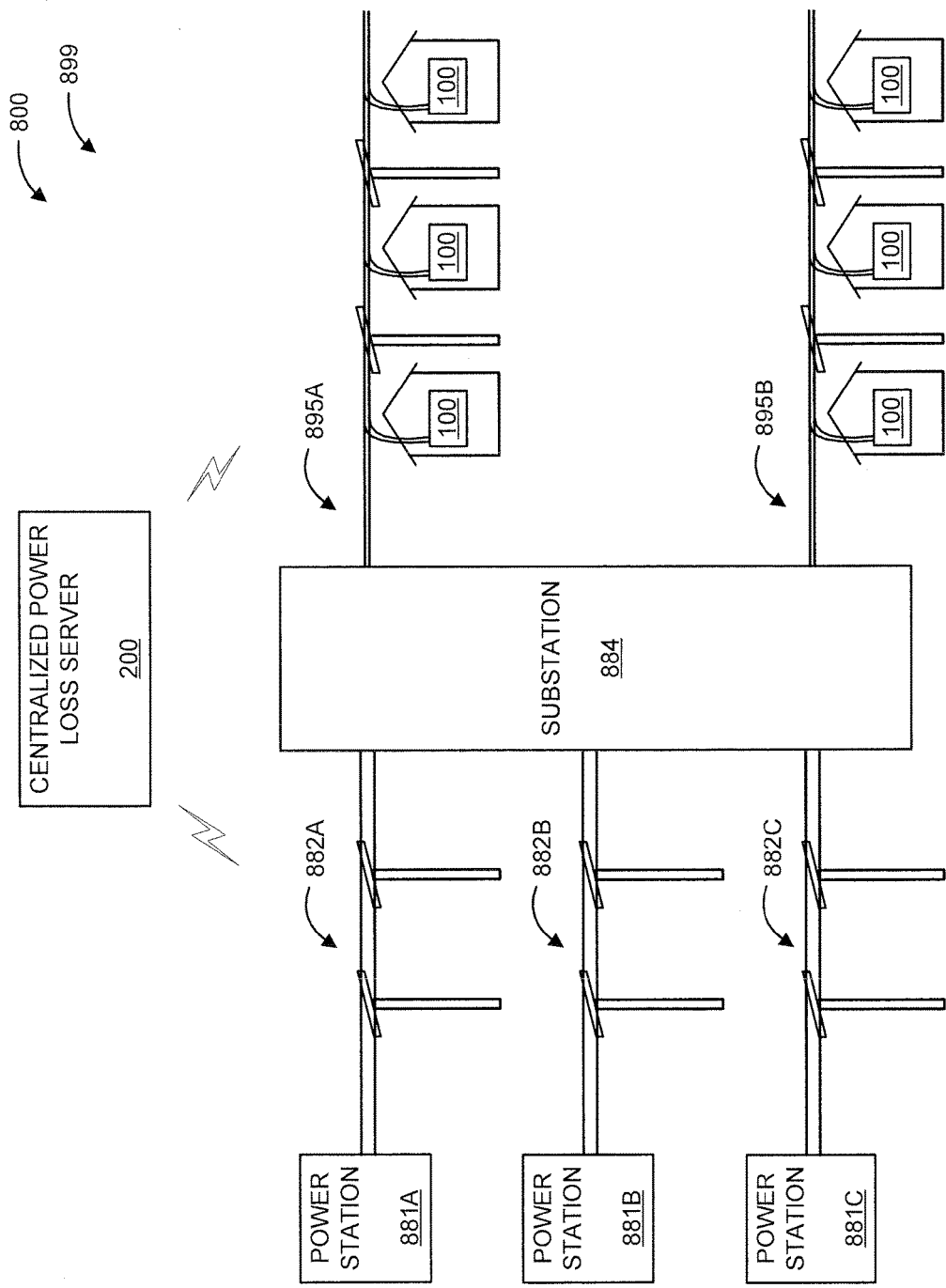
FIG. 8 shows an exemplary system 800 for determining the location and disruption sequence of power outages, in accordance with an embodiment of the present principles.
Figure 9:
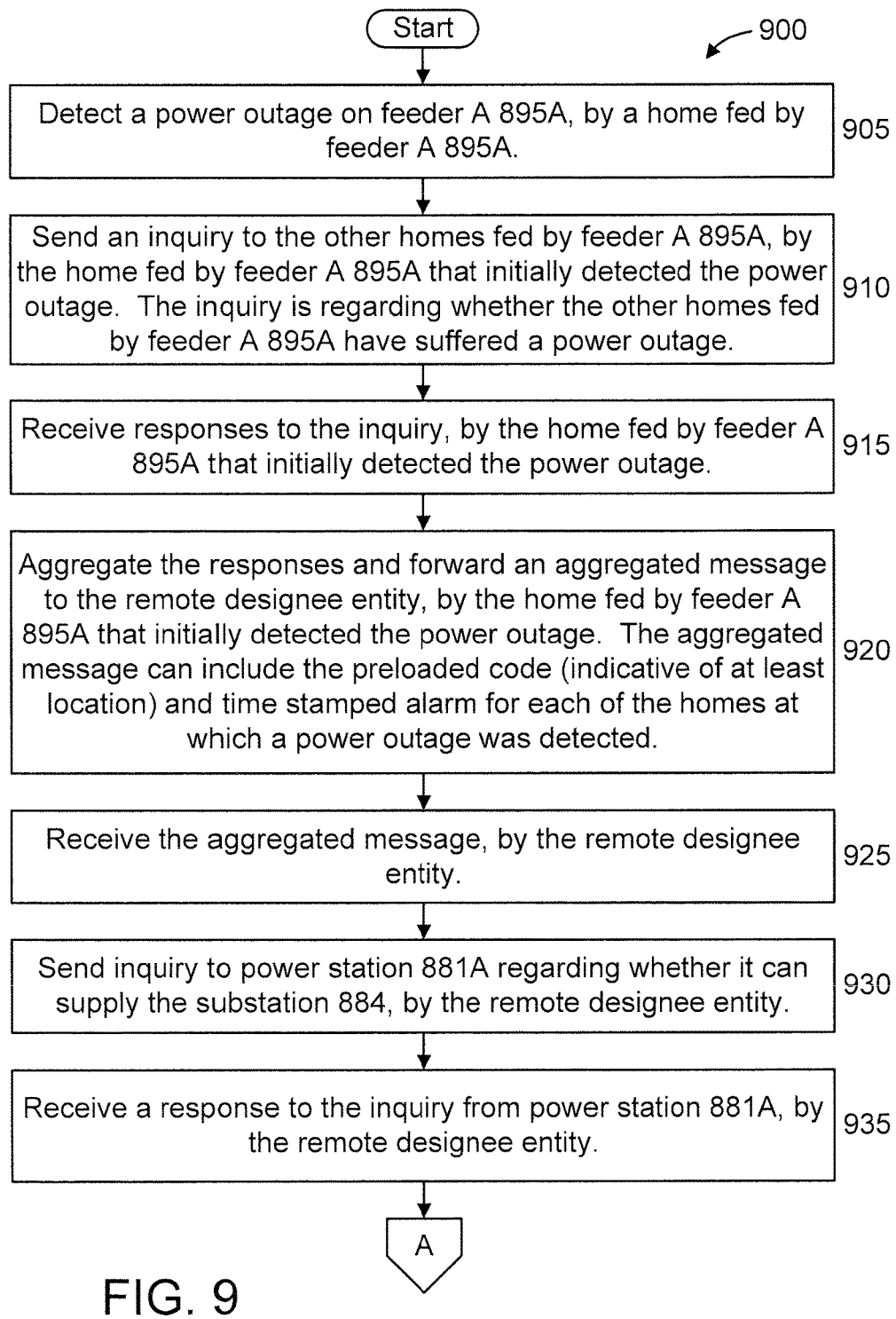
FIG. 9-12 show an exemplary method 900 for determining the location and disruption sequence of power outages, in accordance with an embodiment of the present principles.
Figure 10:
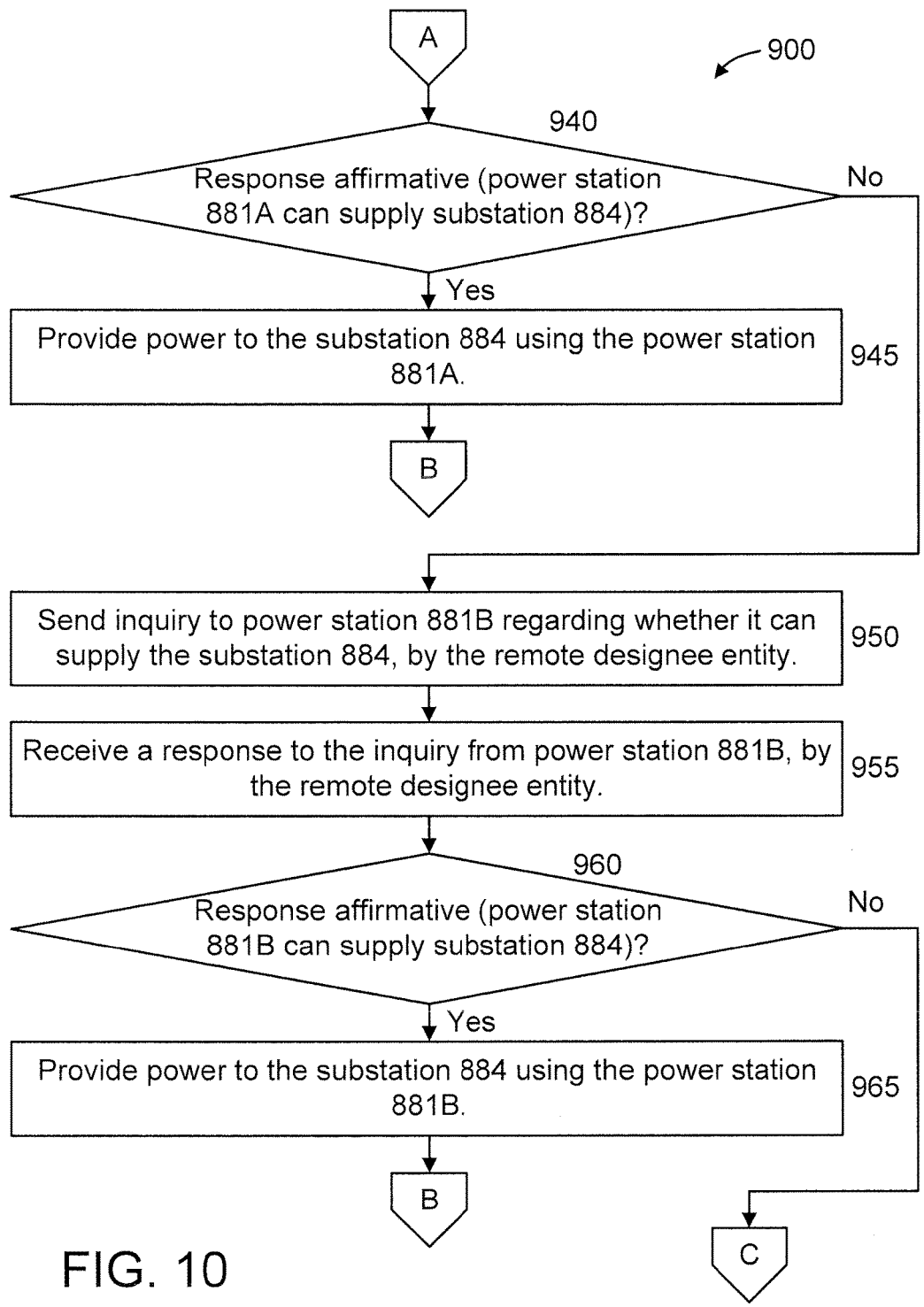
Figure 11:
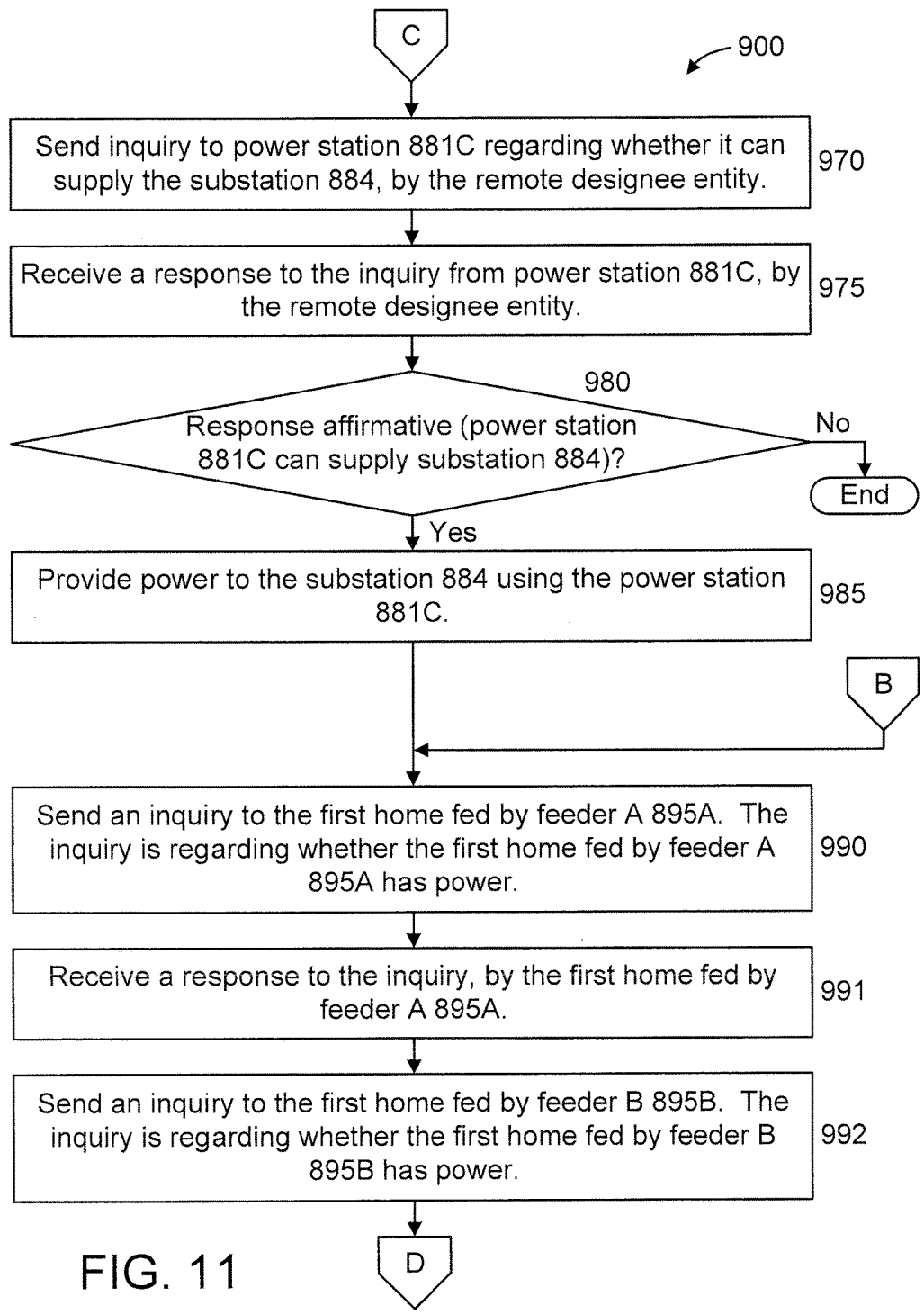
Figure 12:
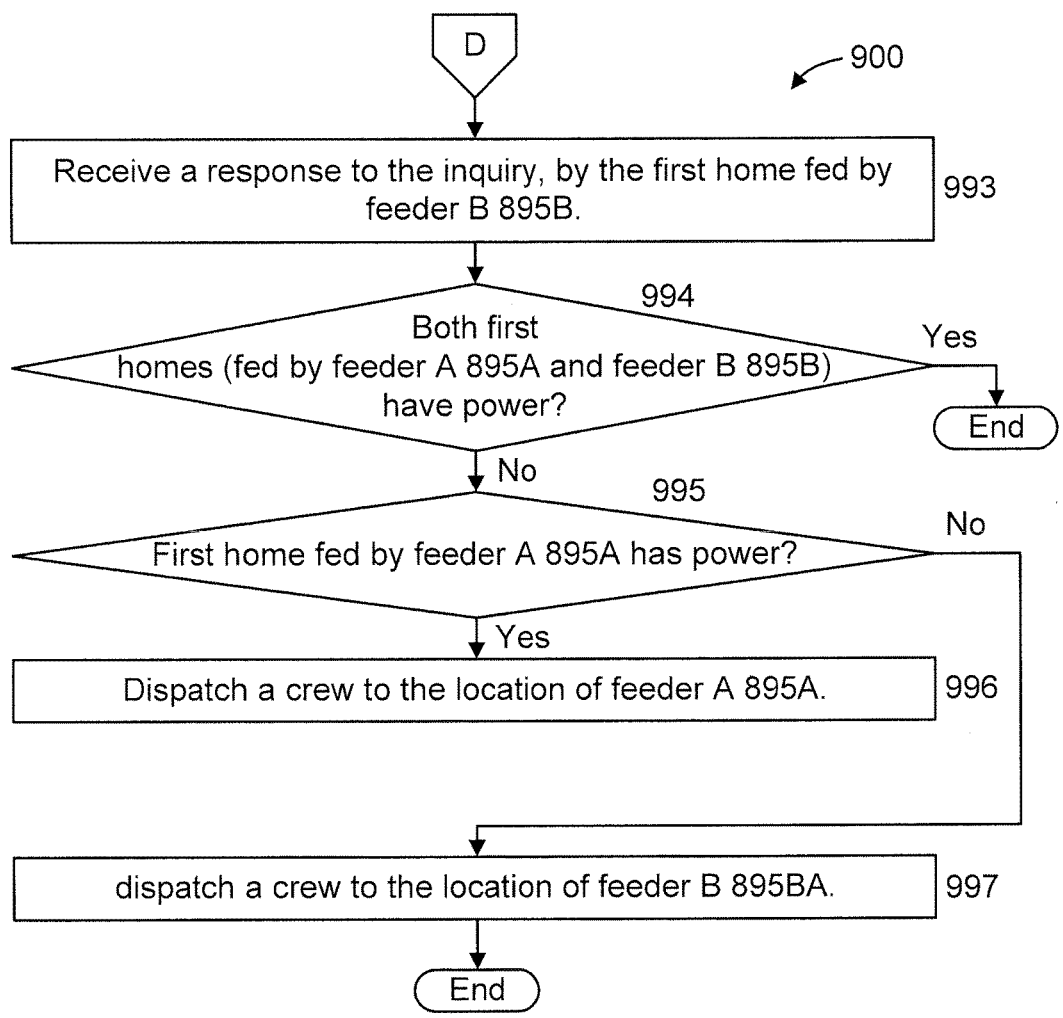

FIG. 8 shows an exemplary system 800 for determining the location and disruption sequence of power outages, in accordance with an embodiment of the present principles. In FIG. 8, the system 800 is deployed in particular scenario 899 as described hereinafter.

The scenario 899 involves a power station 881A connected to a transmission line 882A that, in turn, is connected to a substation 884. The scenario 899 further involves a power station 881B connected to a transmission line 882B that, in turn, is connected to the substation 884. The scenario 899 additionally involves a power station 881C connected to a transmission line 882C that, in turn, is connected to the substation 884. The substation 884 is connected to feeder A 895A and feeder B 895B. Each of the feeders feed multiple buildings (hereinafter "homes" for the sake of illustration). Each of the homes includes a power loss detecting and reporting apparatus such as apparatus 100 in FIG. 1. Each of the apparatuses 100 interact with a centralized power loss server such as centralized power loss server 200 in FIG. 2.

FIGS. 9-12 show an exemplary method 900 for determining the location and disruption sequence of power outages, in accordance with an embodiment of the present principles. The method 900 is performed regarding scenario 899 in FIG. 8.

At step 905, detect a power outage on feeder A 895A, by a home fed by feeder A 895A.

At step 910, send an inquiry to the other homes fed by feeder A 895A, by the home fed by feeder A 895A that initially detected the power outage. The inquiry is regarding whether the other homes fed by feeder A 895A have suffered a power outage.

At step 915, receive responses to the inquiry, by the home fed by feeder A 895A that initially detected the power outage.

At step 920, aggregate the responses and forward an aggregated message to the remote designee entity, by the home fed by feeder A 895A that initially detected the power outage. The aggregated message can include the preloaded code (indicative of at least location) and time stamped alarm for each of the homes at which a power outage was detected.

At step 925, receive the aggregated message, by the remote designee entity.

At step 930, send inquiry to power station 881A regarding whether it can supply the substation 884, by the remote designee entity.

At step 935, receive a response to the inquiry from power station 881A, by the remote designee entity.

At step 940, determine whether the response is in the affirmative (i.e., power station 881A can supply the substation 884). If so, then the method proceeds to step 945. Otherwise, the method proceeds to step 950.

At step 945, provide power to the substation 884 using the power station 881A.

At step 950, send inquiry to power station 881B regarding whether it can supply the substation 884, by the remote designee entity.

At step 955, receive a response to the inquiry from power station 881B, by the remote designee entity.

At step 960, determine whether the response is in the affirmative (i.e., power station 881B can supply the substation 884). If so, then the method proceeds to step 965. Otherwise, the method proceeds to step 970.

At step 965, provide power to the substation 884 using the power station 881B.

At step 970, send inquiry to power station 881C regarding whether it can supply the substation 884, by the remote designee entity.

At step 975, receive a response to the inquiry from power station 881C, by the remote designee entity.

At step 980, determine whether the response is in the affirmative (i.e., power station 881C can supply the substation 884). If so, then the method proceeds to step 985. Otherwise, the method is terminated.

At step 985, provide power to the substation 884 using the power station 881C.

At step 990, send an inquiry to the first home fed by feeder A 895A. The inquiry is regarding whether the first home fed by feeder A 895A has power.

At step 991, receive a response to the inquiry, by the first home fed by feeder A 895A.

At step 992, send an inquiry to the first home fed by feeder B 895B. The inquiry is regarding whether the first home fed by feeder B 895B has power.

At step 993, receive a response to the inquiry, by the first home fed by feeder B 895B.

At step 994, determine whether both first homes (i.e., the first home fed by feeder A 895A and the first home fed by feeder B 895B) have power. If so, then the method is terminated. Otherwise, the method proceeds to step 995.

At step 995, determine whether the first home fed by the feeder A 895A has power. If so, then the method proceeds to step 996. Otherwise, the method proceeds to step 997.

At step 996, dispatch a crew to the location of feeder A 895A. In an embodiment, the crew is dispatched to the location of the home fed by feeder A 895A that initially detected the power outage.

At step 997, dispatch a crew to the location of feeder B 895BA. In an embodiment, the crew is dispatched to the location of the home fed by feeder B 895B that initially detected the power outage.

A further description of various aspects of the present principles will now be generally described, in accordance with one or more embodiments of the present principles.

In an embodiment, the present principles provide an apparatus 100 that measures the alternating current (AC) voltage and analyzes the signal in the frequency domain to establish the signal purity. If the signal is vanishing due to a power interruption in a house, the apparatus 100 will send, through a radio or wireless communication, a message to a pre-defined number that can be, for example, a utility company central voltage monitoring headquarters, to report the power interruption. Each message can include location information, a timestamp, and a reading of the AC voltage magnitude and AC voltage frequency before the interruption.

The apparatus 100 can be normally plugged into a power outlet (or some other portion of the electrical system of a building/location to be monitored) and will stay idle, sending periodically a report to the central location (apparatus 200) about voltage level, location and timestamp. Each apparatus 100 can be equipped with a synchronized clock and a small battery that enable communication when power loss is detected. The synchronized clock can have timekeeping accuracy of the order of milliseconds (or some other amount). The battery is used only when the apparatus senses a power outage.

Each apparatus 100 is also equipped with a cellular transceiver that can communicate with cellular transceivers at neighbor houses and can also send a cellular message to a centralized computer (apparatus 200). If a power outage is detected in a location, the apparatus 100 can inquire other apparatuses 100 located in neighboring properties for voltage presence or absence. If voltage is present at the neighboring properties, then a localized event is reported to the central headquarters (apparatus 200) or a message can be sent to the homeowner (through apparatus 200) indicating a defective electrical circuit. If the neighboring properties indicate a power loss, a message with a timestamp, voltage level and frequency when power loss was detected is transmitted to the central headquarters (apparatus 200).

The centralized location will include a map of the power distribution from the power substation to individual households. Each message is analyzed to establish if neighboring properties indicate a power outage in order to distinguish between a tripped circuit breaker and an actual power outage. The power outage is analyzed for transient spikes in the voltage signals, shifts in the AC frequency, and shifts in the RMS value of the AC signal. If the neighboring properties do not indicate power losses, then most likely the detected event is a power issue at the individual's house. If multiple signals are recorded, the sequence of data receiving is analyzed to track power loss propagation from the substation to the farthest house.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system, comprising:
   a set of in-premises power loss detecting and reporting apparatuses, each having:
      a power loss detection circuit for detecting a local power loss; and
      a cellular transmitter for transmitting (i) a preloaded code indicative of a power loss location and (ii) a time stamped alarm to a remote designee entity using a cellular network responsive to a detection of the power loss,
      wherein the set of apparatuses collectively provide an outage pattern and sequence for a plurality of supplied locations based on the preloaded code and the time stamped alarm.

2. The system of claim 1, wherein each of the power loss detection circuits samples a power signal provided to the respective one of the plurality of supplied locations, determines a magnitude and a frequency of the power signal, and compares the magnitude and the frequency to established values for the respective one of the plurality of supplied locations to detect the local power loss.

3. The system of claim 2, wherein the power loss detection circuit further determines transients in the power signal and compares the transients to established values for the corresponding one of the supplied locations to detect local power anomalies, and the cellular transmitter transmits power anomaly related information to the remote designee entity.

4. The system of claim 1, wherein the in-premises power loss detecting and reporting apparatuses are configured to make inquires amongst each other regarding whether any have detected the local power loss, aggregate replies to the inquires when the local power loss has been detected, and transmit an aggregate response to the remote designee entity.

5. The system of claim 1, where the preloaded code includes property tax map code information.

6. The system of claim 5, where the preloaded code further includes safety information and contact phone numbers associated with the given location.

7. The system of claim 1, wherein the remote designee entity is a utility provider providing the power signal to the plurality of supplied locations.

8. The system of claim 1, wherein each of the in-premises power loss detecting and reporting apparatuses is configured to send a response to the remote designee entity indicating a lack of local power loss, responsive to receiving a power loss inquiry from the remote designee entity and determining the lack of local power loss.

9. The system of claim 1, wherein at least one of the in-premises power loss detecting and reporting apparatuses is located at a substation to detect the local power loss thereat.

10. The system of claim 1, wherein the in-premises power loss detecting and reporting apparatuses are configured to send a power restored message to the remote designee entity upon a detection thereby of a restoration of power subsequent to the local power loss.

11. The system of claim 1, wherein the remote designee entity comprises:
   a cellular receiver for receiving the preloaded code and the time stamped alarm from the in-premises power loss detecting and reporting apparatuses;
   a data processing system for monitoring a spread of the local power loss based on an order of receiving the preloaded code and the time stamped alarm from the power loss detecting and reporting apparatuses; and
   a power manager for initiating a curative action for the local power loss based on the spread.

12. A system, comprising:
   a centralized power loss server, including:
      a cellular receiver for receiving a preloaded code and a time stamped alarm directly from each of one or more remote premises at which a local power loss has been detected;
      a data processing system for monitoring a spread of the local power loss based on an order of receiving the preloaded code and the time stamped alarm from the one or more remote premises; and
      a power manager for initiating a curative action for the local power loss based on the spread.

13. The system of claim 12, wherein the data processing system identifies a first outage location from among the one or more remote premises based on the order of receiving the preloaded code and the time stamped alarm.

14. The system of claim 13, wherein the data processing system dispatches a message to a power repair crew indicating the first outage location.

15. The system of claim 12, further comprising a set of in-premises power loss detecting and reporting apparatuses for sending the preloaded code and the time stamped alarm to the centralized power loss server responsive to a detection of the local power loss thereat.

16. The system of claim 15, wherein at least one of the in-premises power loss detecting and reporting apparatuses is located at a substation to detect the local power loss thereat.

17. The system of claim 16, wherein the power manager redirects power through at least one of a different transmission line and a different substation, when the at least one of the in-premises power loss detecting and reporting apparatuses located at the substation detects the local power loss thereat.

18. The system of claim 12, wherein the cellular receiver receives, from the each of one or more remote premises, a power restored message upon a detection thereat of a restoration of power subsequent to the local power loss.

19. A method, comprising:
   configuring a set of in-premises power loss detecting and reporting apparatuses, each of the apparatuses having a power loss detection circuit and a cellular transmitter; and
   deploying the set of in-premises power loss detecting and reporting apparatuses at a plurality of supplied locations to collectively provide an outage pattern and sequence for the plurality of supplied locations based on the preloaded code and the time stamped alarm
wherein said configuring step comprises:
   configuring the power loss detection circuit of each of the apparatuses to detect a local power loss; and
   configuring the cellular transmitter of each of the apparatuses to transmit (i) a preloaded code indicative of a power loss location and (ii) a time stamped alarm to a remote designee entity using a cellular network responsive to a detection of the power loss.

20. The method of claim 19, further comprising configuring the in-premises power loss detecting and reporting apparatuses to make inquires amongst each other regarding whether any have detected the local power loss, aggregate replies to the inquires when the local power loss has been detected, and transmit an aggregate response to the remote designee entity.

* * * * *